June 6, 1933. E. T. PLATZ 1,912,592
CONTROL DEVICE FOR AUTOMOTIVE VEHICLES
Filed Feb. 23, 1928
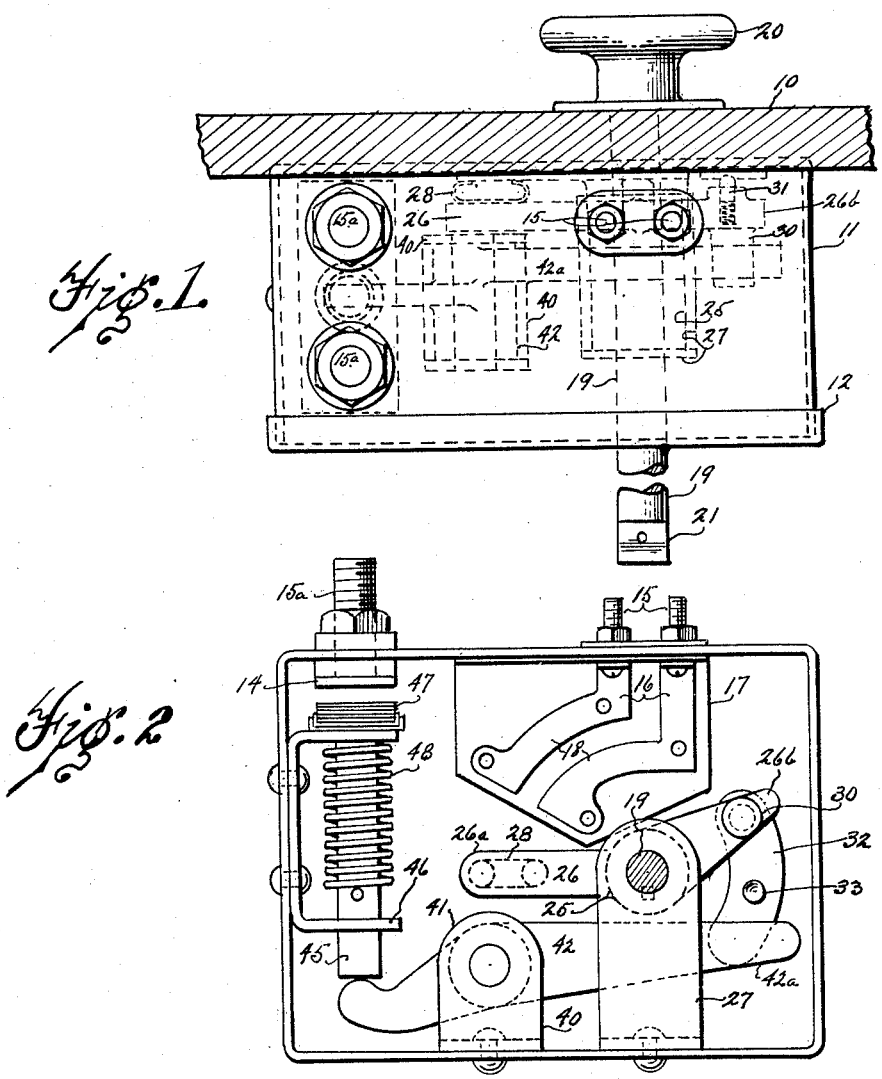
INVENTOR.
Elwood T. Platz
BY
Francis D. Hardesty
ATTORNEY.

Patented June 6, 1933

1,912,592

UNITED STATES PATENT OFFICE

ELWOOD T. PLATZ, OF DETROIT, MICHIGAN

CONTROL DEVICE FOR AUTOMOTIVE VEHICLES

Application filed February 23, 1928. Serial No. 256,142.

The present invention relates to control devices for automotive vehicles and more especially, to control devices for such vehicles as are propelled by internal combustion engines.

In the conventional vehicles of this type, it is customary to provide upon the instrument board thereof, a switch by means of which an electric circuit may be made or broken through the ignition devices for the engine, and likewise a means for controlling the carburetor of said engine so as to cause the latter to produce a rich gaseous mixture for starting said motor.

This latter means is commonly called the "choke" control and is usually in the form of a rod movable in and out to operate a suitable valve in the carburetor. It is likewise customary to provide, in the driver's compartment, a suitable switch whereby current from a storage battery may be directed through a motor which cranks the engine, also for the purpose of starting.

It is customary to provide these several devices at convenient locations in the driver's compartment but the conventional vehicle has them as separate controls with the "starter" switch usually operable by the driver's foot.

Among the objects of the present invention is to combine the three controls mentioned, into a single device operable by means of a single handle and at the same time certain ones are operable individually, if desired.

Other objects will readily occur to those skilled in the art upon reference to the following description and the accompanying drawing in which:—

Figure 1 is a plan view of the combined control as mounted upon an instrument board of an automobile;

Figure 2 is a rear view of the device with the cover removed and showing the working parts therein.

In the drawing, the instrument board of an automobile or other internal combustion engine propelled vehicle is shown at 10. On the back of this board is a casing 11 provided with a suitable cover 12. Secured in the casing and suitably insulated therefrom are two contact members 14 provided with external means 15a for attachment of proper wires or other conductors which conductors form part of the starting motor circuit. Also extending through the casing are two suitable insulated leads 15 leading to the ignition circuit, connected inside of the casing with contact plates 16 which in turn are mounted upon an insulating base 17.

The plates 16 are arranged on the base 17 parallel to but spaced from each other, with the outer ends 18 thereof curved to form arcs of which the center is a shaft 19. This shaft 19 consists of a rod extending through the casing and through the instrument board having at the end protruding from the instrument board a suitable handle 20 by means of which it may be rotated or moved longitudinally. The other end of the rod 19 is provided with means 21 for the connection of a rod or wire extending to the choke valve of the carburetor, (not shown).

The rod 19 is splined in a sleeve 25 which forms a part of a lever 26 and, in order to provide proper bearings for the rod 19 a yoke 27 is secured to the bottom of the casing having its arms extending vertically and provided with openings through which said rod extends and in which the latter has bearings. This yoke will also position the sleeve 25 lengthwise of the rod 19.

As mentioned above, the sleeve 25 forms a part of the lever 26 having two arms 26a and 26b extending on opposite sides of the sleeve and inclined somewhat toward each other. The lever arm 26a carries on one face thereof and insulated therefrom a double spring contact member 28 adapted to contact with the plate parts 18 and thereby complete a circuit between the terminals 15. The other end 26b of the lever carries a boss 30, preferably on the opposite side of the lever from contact member 28, which boss is bored axially on the face of the lever arm corresponding to the face carrying the contact 28. In the axial bore is a small spring pressed plunger 31 adapted to press against a plate 32 which is provided with a suitable depression 33 which latter, together with the plunger 31, provides an indicating and holding means to hold the contact member 28 in proper position to complete the circuit above mentioned.

Also mounted within the casing 11, is a second yoke 40 having up-standing arms 41 serving to position and mount a lever 42 having bearings in said arms 41. This lever 42 has a comparatively long arm 42a extending in the path of lug 30 on lever 26 so that when the lever 26 is rotated beyond the stop 33, the arm 26b of lever 26 contacts with this arm 42a to operate the lever 42. The other arm of lever 42 is adapted to move longitudinally a plunger 45 mounted in a suitable yoke 46 on the side of the casing, and provided with suitable means to prevent rotation, which plunger carries at its upper end spring contact fingers 47 adapted to complete the circuit between terminals 15a by bridging across the contacts 14. A suitable spring 48 is provided to break the circuit by moving the plunger down when the lever 42 is not being positively actuated.

In the operation of the device, in starting the engine, the handle 20 may be moved longitudinally to actuate the choke valve and may likewise be rotated to make the ignition circuit through the bridging of contact member 28 across plates 18. A proper running position of the ignition circuit will be indicated when the plunger 31 coacts with the depression 33. The ignition circuit will be maintained closed during the movement of rotation of lever 26 for a short distance beyond the stop 33 and the rotation may therefore be continued beyond the stop 33 for a sufficient distance to permit the boss 30 to press down the end 42a of lever 42 to complete the circuit through the starting motor.

As soon as the engine has been cranked sufficiently, release of the handle 20 will permit the spring 48 to break the starting motor circuit and restore the lever 26 to running position, as indicated by the stop 33. The choke action may then be operated independently of either the starting or ignition elements.

Now having described the invention and the preferred form of embodiment thereof, it is to be understood that the same is to be limited not to the specific details herein set forth but only by the scope of the claims which follow.

I claim:—

1. In an automotive vehicle, a choke control rod movable longitudinally to operate said choke and adapted to be rotated, a switch lever mounted on said choke rod and adapted to be rotated thereby to make and break the ignition circuit, and a starting motor switch adapted to be operated by said switch lever upon movement of the latter beyond normal running position.

2. A control unit for automotive vehicles, comprising a casing adapted to be mounted upon the instrument board of said vehicle, and having a longitudinally movable shaft extending therethrough, said shaft being also rotatable, a handle on said shaft, a pair of levers in said casing operable in series by rotation of said shaft, ignition circuit contact members mounted in said casing, and starting motor circuit contact members also mounted in said casing, means carried by one of said levers for completing said ignition circuit, and means operated by the other of said levers for completing the starting motor circuit.

3. A control unit for automotive vehicles comprising a casing having terminals for a plurality of electric circuits mounted therein, means for completing one of said circuits, a second means for completing the other of said circuits, a choke control extending through said casing and movable to actuate one of said means to circuit closing position, said means being operable by said choke control a further distance to in turn actuate the other of said means to close the second circuit and means on said second circuit closing means for returning said second means to the circuit breaking position.

4. A control device for an automotive vehicle propelled by an internal combustion engine comprising a unit containing in combination a starting switch, an ignition switch, a choke control, and a single element operatively connected to and adapted to operate said switches and said control, said single element being so mounted that it may be rotated, reciprocated, or rotated and reciprocated, as desired, to enable actuating one or all of the switches and choke control thereby.

ELWOOD T. PLATZ.